United States Patent
Jung et al.

(10) Patent No.: US 9,848,382 B2
(45) Date of Patent: Dec. 19, 2017

(54) METHOD FOR ESTABLISHING RRC CONNECTION FOR CELL OF TERMINAL AND TERMINAL USING SAME

(71) Applicant: LG Electronics Inc., Seoul (KR)

(72) Inventors: Sunghoon Jung, Seoul (KR); Jaewook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 35 days.

(21) Appl. No.: 15/035,540

(22) PCT Filed: Nov. 11, 2014

(86) PCT No.: PCT/KR2014/010811
§ 371 (c)(1),
(2) Date: May 10, 2016

(87) PCT Pub. No.: WO2015/069091
PCT Pub. Date: May 14, 2015

(65) Prior Publication Data
US 2016/0302151 A1   Oct. 13, 2016

Related U.S. Application Data

(60) Provisional application No. 61/902,492, filed on Nov. 11, 2013.

(51) Int. Cl.
| | |
|---|---|
| *H04W 52/02* | (2009.01) |
| *H04W 76/02* | (2009.01) |
| *H04L 12/26* | (2006.01) |
| *H04W 72/08* | (2009.01) |

(Continued)

(52) U.S. Cl.
CPC ......... *H04W 52/0219* (2013.01); *H04L 43/16* (2013.01); *H04W 52/0216* (2013.01); *H04W 52/0229* (2013.01); *H04W 72/085* (2013.01); *H04W 76/027* (2013.01); *H04W 76/046* (2013.01); *H04W 88/16* (2013.01); *Y02B 60/50* (2013.01)

(58) Field of Classification Search
None
See application file for complete search history.

(56) References Cited

U.S. PATENT DOCUMENTS

| 2006/0084443 A1 | 4/2006 | Yeo et al. | |
| 2008/0032714 A1* | 2/2008 | Suzuki | H04W 4/16 |
| | | | 455/458 |

(Continued)

FOREIGN PATENT DOCUMENTS

| EP | 1881718 | 1/2008 |
| KR | 1020130018139 | 2/2013 |
| KR | 1020130073850 | 7/2013 |

*Primary Examiner* — Anh Ngoc Nguyen
(74) *Attorney, Agent, or Firm* — Dentons US LLP

(57) ABSTRACT

Provided are a method for establishing a radio resource control (RRC) connection for a cell of a terminal and a terminal using the method. The method determines the number of times of failure in RRC connection establishment for the cell and applies a first access class barring (ACB) parameter or a second ACB parameter on the basis of the number of times of the failure, wherein the second ACB parameter is a parameter which increases an access blocking probability for the cell in comparison with the first ACB parameter.

12 Claims, 18 Drawing Sheets

(51) Int. Cl.
*H04W 76/04* (2009.01)
*H04W 88/16* (2009.01)

(56) References Cited

U.S. PATENT DOCUMENTS

| | | | |
|---|---|---|---|
| 2010/0240377 A1* | 9/2010 | De Pasquale | H04W 28/16 455/445 |
| 2013/0051366 A1 | 2/2013 | Amerga et al. | |
| 2013/0170343 A1* | 7/2013 | Ye | H04W 48/06 370/230 |
| 2014/0106738 A1* | 4/2014 | Ostrup | H04W 24/02 455/422.1 |

* cited by examiner

METHOD FOR ESTABLISHING RRC CONNECTION FOR CELL OF TERMINAL AND TERMINAL USING SAME

This application is a 35 USC §371 National Stage entry of International Application No. PCT/KR2014/010811 filed Nov. 11, 2014, and claims priority to U.S. Provisional Application No. 61/902,492 filed Nov. 11, 2013, all of which are hereby incorporated by reference in their entireties as if fully set forth herein.

BACKGROUND OF THE INVENTION

Field of the Invention

The present invention relates to a method for establishing a radio resource control (RRC) connection for a cell of a terminal in a mobile communication system and a terminal using the same.

Related Art

A universal mobile telecommunications system (UMTS) is a $3^{rd}$ generation asynchronous mobile communication system that operates in wideband code division multiple access (WCDMA) based on European systems such as global system for mobile communications (GSM0 and general packet radio services (GPRS). Long-term evolution (LTE) of the UMTS has been discussed by $3^{rd}$ generation partnership project (3GPP) that standardizes the UMTS. 3GPP LTE is a technology for high-speed packet communication. The 3GPP LTE requires cost reduction of a user and a provider, improvement of a service quality, coverage and a system capacity which are extended and improved, flexible use of a frequency band, a simple structure, an open interface, and appropriate power use of a terminal. A lot of schemes have been proposed for the requirements.

The terminal can communicate with a base station after establishing a radio resource control (RRC) connection. When the user turns on a power supply of the terminal at first, the terminal first searches an appropriate cell and thereafter, stays in an RRC idle state (RRC_IDLE) in the corresponding cell. The terminal which stays in the RRC idle state makes the RRC connection with an RRC layer of a network through an RRC connection procedure and is transited to the RRC connection state (RRC_CONNECTED) when the terminal needs to make the RRC connection. There are various cases in which the terminal in the RRC idle state needs to make the RRC connection. For example, when uplink data needs to be transmitted due to a call attempt of the user, and the like or a paging message is received from the network, the terminal needs to make the RRC connection with the RRC layer of the network at the time of transmitting a response message thereto.

Meanwhile, in the terminal, an RRC connection failure may repeatedly occur during the RRC connection procedure with a specific cell. For example, a case may occur, in which a downlink quality is good but an uplink quality is not good in the specific cell due to a geographical environment, an irregular distribution of attenuation factors, and the like. In this case, when the terminal measures a signal transmitted by the specific cell, since a downlink reception signal quality is good, the terminal may intend to the specific cell and announce the selection of the specific cell to the specific cell. However, since the uplink quality is not good, the cell selection may not normally be transferred to the specific cell. As a result, the RRC connection failure which is repeated may occur with respect to the specific cell.

Required are a method and an apparatus which can solve the problem.

SUMMARY OF THE INVENTION

The present invention has been made in an effort to provide a method for establishing an RRC connection for a cell of a terminal and a terminal using the same.

In an aspect, a method for establishing a radio resource control (RRC) connection for a cell of a terminal is provided. The method comprises determining the number of times of failure in RRC connection establishment for the cell and applying a first access class barring (ACB) parameter or a second ACB parameter on the basis of the number of times of the failure, wherein the second ACB parameter is a parameter which increases an access blocking probability for the cell in comparison with the first ACB parameter.

When the number of times of failure is more than a predetermined number (N) of times, the second ACB parameter may be applied to the cell.

The N may be a predetermined value or a value set by a network.

The second ACB parameter may be applied to the cell when the RRC connection establishment for the cell is unsuccessful consecutively N times.

The second ACB parameter may be applied to the cell when the RRC connection establishment for the cell is unsuccessful consecutively N times for a predetermined time.

The second ACB parameter may be applied to the cell when the RRC connection establishment for the cell is unsuccessful accumulatively N times for a predetermined time.

The second ACB parameter may be applied to the cell when all RRC connection establishment procedures are unsuccessful for a predetermined time after the RRC connection establishment for the cell is unsuccessful at first.

The first ACB parameter and the second ACB parameter may be received form the network.

When the number of times of failure is more than a predetermined number (N) of times and the second ACB parameter is received, the second ACB parameter may be applied to the cell.

An ACB parameter correction value is received from the network, and the second ACB parameter may be generated by applying the ACB parameter correction value to the first ACB parameter.

Each of the first and second ACB parameters may include at least one of a barring factor and a barring time for the cell.

In another aspect, a terminal for establishing a radio resource control (RRC) connection for a cell is provided. The terminal comprise a radio frequency (RF) unit transceiving a radio signal and a processor connected with the RF unit, wherein the processor configured to determine the number of times of failure in RRC connection establishment for the cell, and apply a first access class barring (ACB) parameter or a second ACB parameter on the basis of the number of times of the failure, and wherein the second ACB parameter is a parameter which increases an access blocking probability for the cell in comparison with the first ACB parameter.

When RRC connection establishment is repeatedly unsuccessful with respect to a specific cell, a blocking probability for the specific cell consequently increases. Accordingly, measurement and RRC connection procedures which are unnecessarily repeated with respect to the specific cell can be reduced. Accordingly, power consumption of a terminal can be reduced.

DESCRIPTION OF EXEMPLARY EMBODIMENTS

Figure 1:
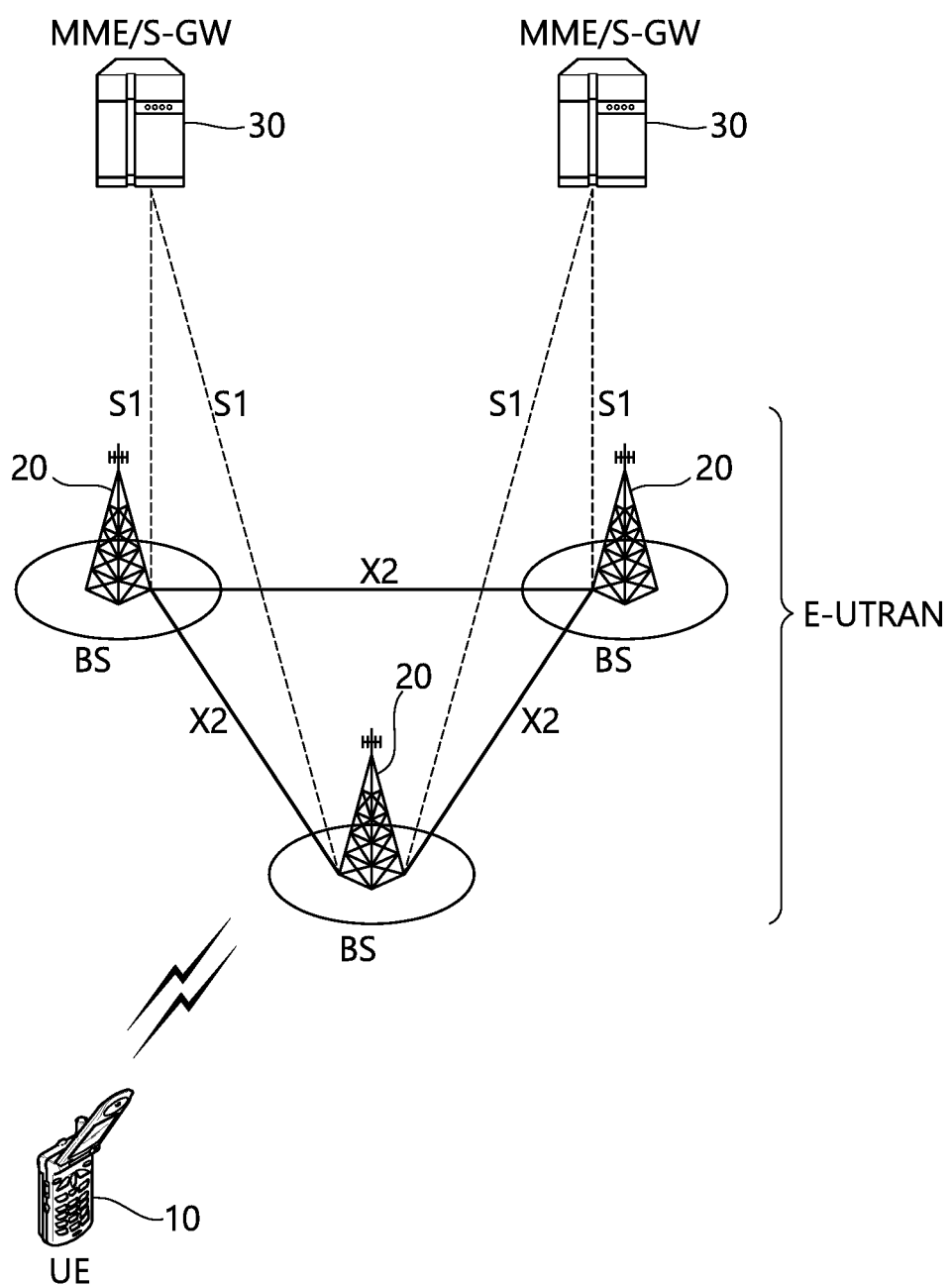
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
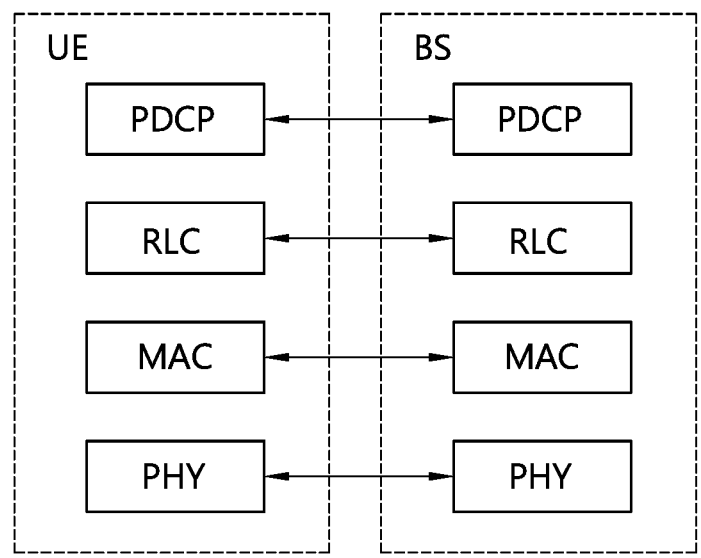
FIG. 2 is a diagram showing a wireless protocol architecture for a user plane.
Figure 3:
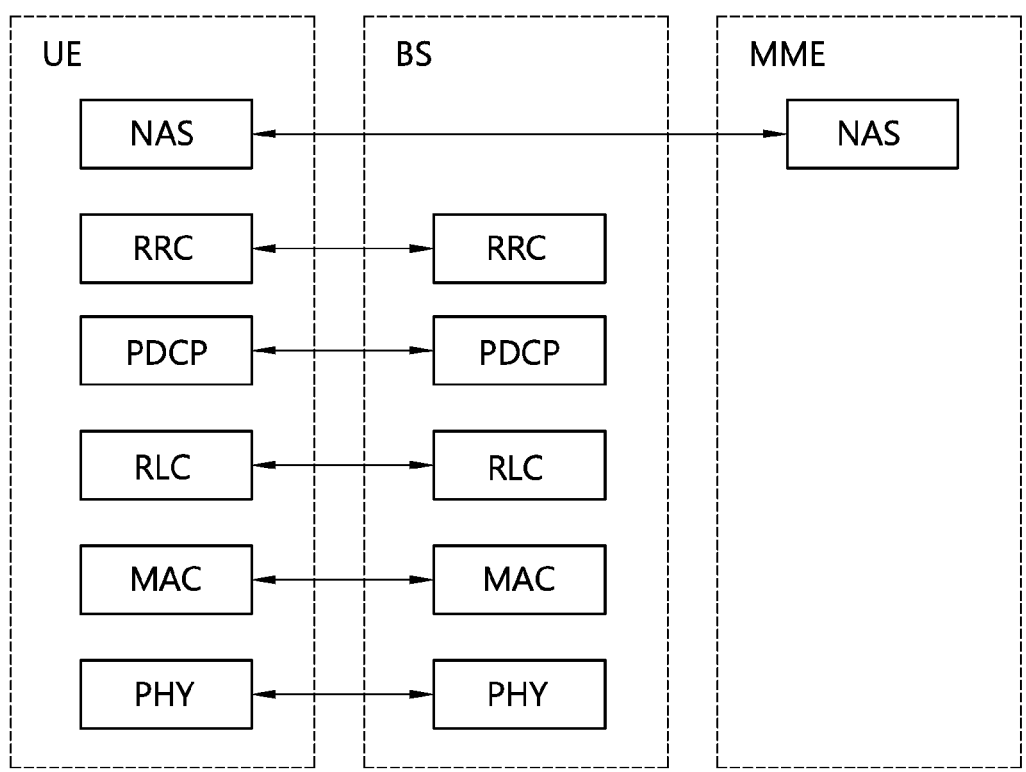
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include a limited number of parameters that are most essential and most frequently transmitted when other information is required to be obtained from a cell. UE first searches for an MIB after downlink synchronization. The MIB may include information, such as an SFN that supports downlink channel bandwidth, a PHICH configuration, and synchronization and operates as a timing criterion and an eNB transmit antenna configuration. The MIB may be transmitted on a broadcast channel (BCH) through broadcasting.

SystemInformationBlockType1 (SIB1) of included SIBs is included in a "SystemInformationBlockType1" message and transmitted. The remaining SIBs other than the SIB1 is included in a system information message and transmitted. To map the SIBs to the system information message may be flexibly configured by a scheduling information list parameter included in the SIB1. In this case, each of the SIBs is included in a single system information message, and only SIBs having the same scheduling requirement value (e.g. cycle) may be mapped to the same system information message. Furthermore, a SystemInformationBlockType2 (SIB2) is always mapped to a system information message corresponding to the first entry within the system information message list of a scheduling information list. A plurality of system information messages may be transmitted within the same cycle. The SIB1 and all the system information messages are transmitted on a DL-SCH.

In addition to broadcast transmission, in an E-UTRAN, the SIB1 may be dedicated-signaled in the state in which it includes a parameter configured like an existing configured value. In this case, the SIB1 may be included in an RRC connection reconfiguration message and transmitted.

The SIB1 includes information related to UE cell access, and defines the scheduling of other SIBs. The SIB1 may include information related to the PLMN identifiers of a network, tracking area code (TAC) and a cell ID, a cell barring status indicative of whether a cell is a cell on which camp-on is possible, the lowest reception level required within a cell which is used as cell reselection criterion, and the transmission time and cycle of other SIBs.

The SIB2 may include radio resource configuration information common to all pieces of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and detecting a change of system information to a primary cell (PCell) only. In a secondary cell (SCell), when a corresponding SCell is added, an E-UTRAN may provide all of pieces of system information related to an RRC connection state operation through dedicated signaling. When system information related to a configured SCell is changed, an E-UTRAN may release an SCell that is taken into consideration and subsequently add the changed system information. This may be performed along with a single RRC connection reconfiguration message. An E-UTRAN may configure parameter values different from a value broadcasted within an SCell that has been taken into consideration through dedicated signaling.

UE needs to guarantee the validity of a specific type of system information, and such system information is called required system information. The required system information may be defined as follows.

If UE is an RRC idle state: The UE needs to be guaranteed so that it has the valid versions of the MIB and the SIB1 in addition to the SIB2 to SIB8. This may comply with the support of a radio access technology (RAT) that is taken into consideration.

If UE is an RRC connection state: The UE needs to be guaranteed so that it has the valid versions of the MIB, the SIB1, and the SIB2.

In general, the validity of system information may be guaranteed up to a maximum of 3 hours after the system information is obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG 3) A barred cell: this cell is a cell that broadcasts information indicative of a barred cell through system information.

4) A reserved cell: this cell is a cell that broadcasts information indicative of a reserved cell through system information.

Figure 4:
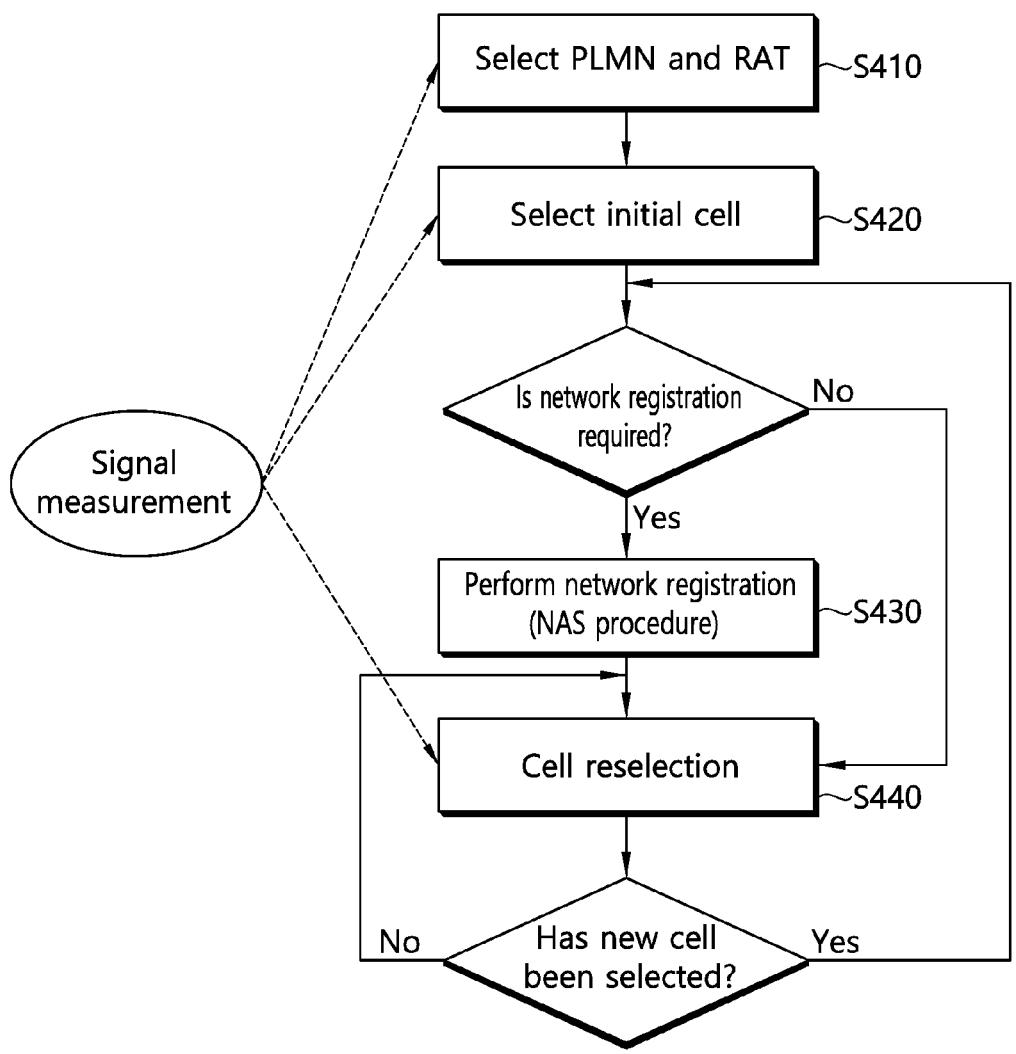
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
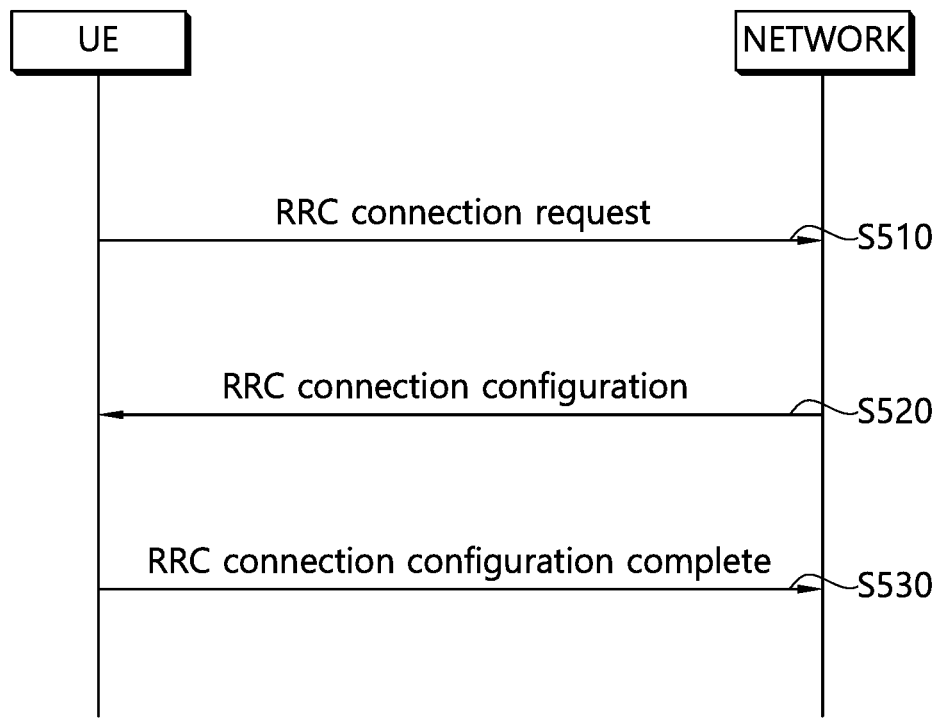
FIG. 5 is a flowchart illustrating a process of establishing RRC connection.

FIG. 5 is a flowchart illustrating a process of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
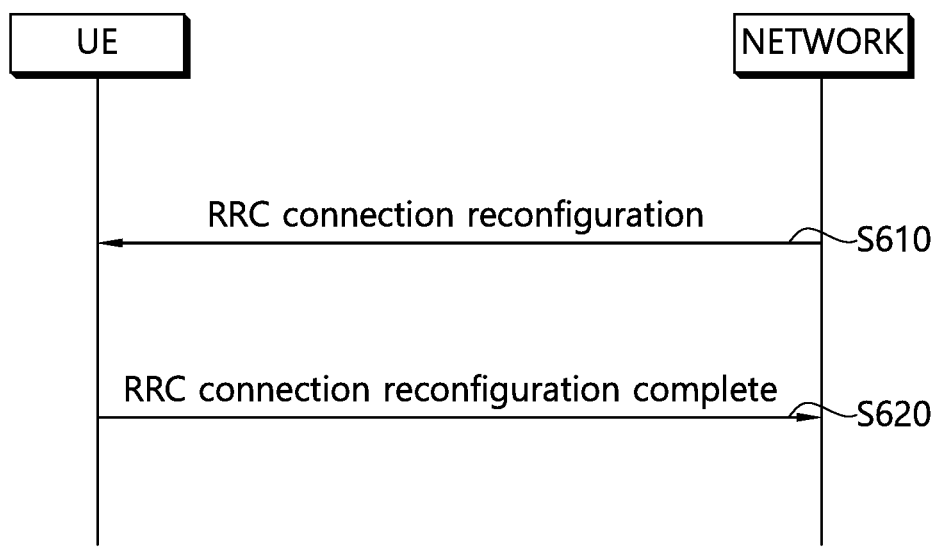
FIG. 6 is a flowchart illustrating an RRC connection reconfiguration process.

FIG. 6 is a flowchart illustrating an RRC connection reconfiguration process. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

A cell selection criterion may be defined as in Equation 1 below.

$$Srxlev > 0 \text{ AND } Squal > 0, \quad \text{[Equation 1]}$$

where:

$$Srxlev = Q_{rxlevmeas} - (Q_{rxlevmin} + Q_{rxlevminoffset}) - P_{compensation},$$

$$Squal = Q_{qualmeas} - (Q_{qualmin} + Q_{qualminoffset})$$

In this case, in Equation 1, the variables may be defined as in Table 1 below.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | $\max(P_{EMAX} - P_{PowerClass}, 0)$ (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

$Q_{rxlevminoffset}$ and $Q_{qualminoffset}$, that is, signaled values, are the results of periodic discovery for a PLMN having higher priority while UE camps on a normal cell within a VPLMN, and may be applied only when cell selection is evaluated. As described above, during the periodic discovery of a PLMN having higher priority, UE may perform cell selection evaluation using parameter values stored from another cell of the PLMN having such higher priority.

After UE selects any cell through a cell selection process, the intensity or quality of a signal between the UE and a BS may be changed due to the mobility of the UE or a change of a radio environment. Accordingly, if the quality of the selected cell is changed, the UE may select another cell providing better quality.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to give the priority of a cell is defined as in Equation 2.

$$R_s = Q_{meas,s} + Q_{hyst}, R_n = Q_{meas,n} - Q_{offset}$$ [Equation 2]

In Equation 2, $R_s$ is the ranking criterion of a serving cell on which UE now camps, $R_n$ is the ranking criterion of a neighboring cell, $Q_{meas,s}$ is the quality value of the serving cell measured by the UE, $Q_{meas,n}$ is the quality value of the neighboring cell measured by the UE, $Q_{hyst}$ is a hysteresis value for ranking, and $Q_{offset}$ is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

A Radio Link Failure (RLF) is described below.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
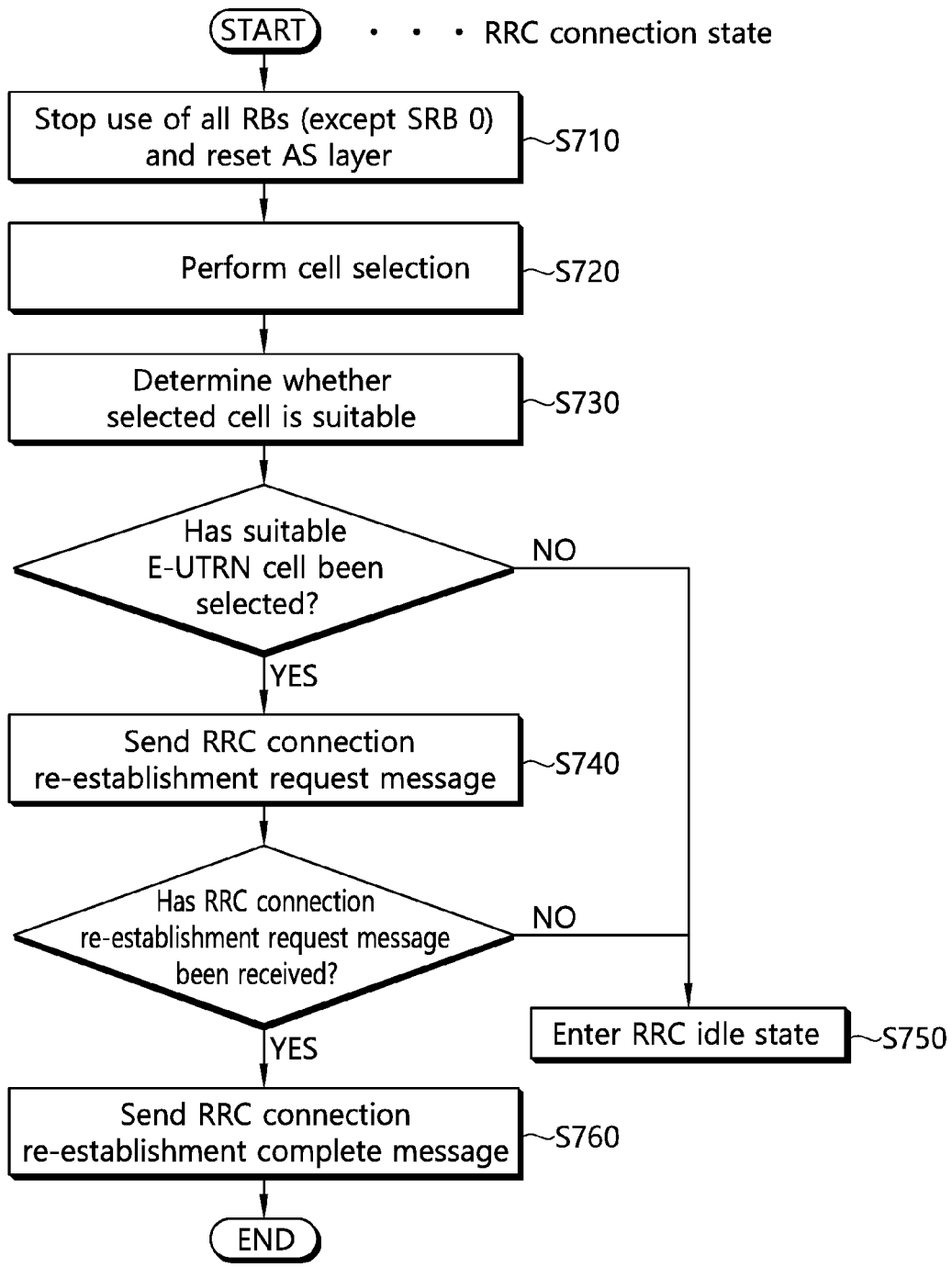
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this process, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Now, the present invention will be described.

Figure 8:
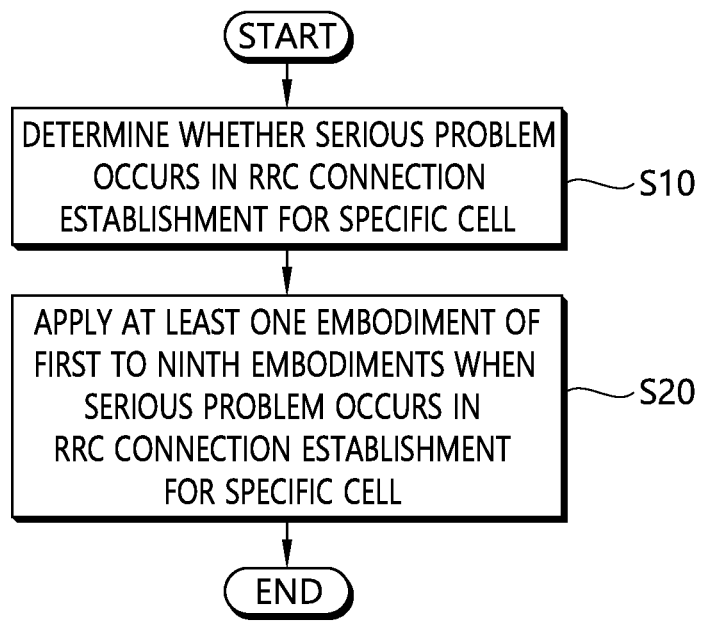
FIG. 8 illustrates an overview of the present invention.

FIG. 8 illustrates an overview of the present invention.

Referring to FIG. 8, a terminal determines whether a serious problem occurs during establishing an RRC connection with a specific cell (S10).

When the serious problem occurs in establishing the RRC connection with the specific cell, the terminal may apply at least one embodiment among first to ninth embodiments to be described below (S20).

That is, the present invention is applied when the terminal detects the serious problem during establishing the RRC connection with the cell. Herein, it may be detected/regarded that the serious problem occurs when at least one of conditions given below is satisfied.

1. It may be regarded that the serious problem occurs when the terminal fails in N consecutive RRC connection establishment attempts.

Herein, N may be a predetermined value or a value which a network may set and a natural number of 1 or 2 or more. The failure in the RRC connection establishment attempt may be determined depending on whether a timer T300 is terminated. The timer T 300 is a timer that starts when an RRC connection request message is transmitted and stops when an RRC connection configuration or RRC connection rejection message is received.

2. It may be regarded that the serious problem occurs when the terminal fails in N consecutive RRC connection establishment attempts for T which is a predetermined time interval. Herein, N may be a predetermined value or the value which the network may set and the natural number of 1 or 2 or more. That is, as compared with the '1.' condition, an additional condition is added to the '2.' condition in terms of a time. The failure in the RRC connection establishment attempt may be determined depending on whether the timer T300 is terminated. The T may be a predetermined value or a value which the network may set.

3. It may be regarded that the serious problem occurs when the terminal transmits a random access channel (RACH) preamble consecutively at N times as many as 'MaxNumber'. Herein, 'MaxNumber' or N may be a predetermined value or a value which the network may set.

4. It may be regarded that the serious problem occurs when the terminal fails in N consecutive RRC connection establishment attempts for T which is the predetermined time interval. The '4.' condition is different from the '2.' condition in that the condition is satisfied even though the terminal does not fail in N consecutive RRC connection establishment attempts. Herein, N and T may be a predetermined value or a value which the network may set. The failure in the RRC connection establishment attempt may be determined depending on whether the timer T300 is terminated.

5. It may be regarded that the serous problem occurs when the terminal attempts the RRC connection establishment for T which is the predetermined time interval after failing in the RRC connection establishment attempts, but fails in all RRC connection establishment attempts.

Hereinafter, methods will be described, which may be applied when the serous problem occurs during the RRC connection procedure between the terminal and the cell.

First Embodiment

When the serious problem is detected during the RRC connection establishment procedure with the cell, the ter-minal may not regard the cell as a candidate cell during a cell reselection procedure. That is, in respect to the cell in which the serious problem occurs, the cell is prevented from being selected during the cell reselection procedure. When the RRC connection establishment procedure with the cell to which the embodiment is applied is successful, the terminal stops using the embodiment and applies a general method.

When the serious problem is detected during the RRC connection establishment procedure with the cell, the terminal may not regard the cell as a candidate cell during a cell reselection procedure and not regard even other cells of a frequency at which the cell is positioned as the candidate cell during the cell reselection procedure.

That is, when the serious problem is detected during the RRC connection establishment procedure with a specific cell, the frequency at which the specific cell is positioned is prevented from being selected during the cell reselection procedure.

When the terminal detects the serious problem during the RRC connection establishment procedure with the specific cell, a network may provide an indicator indicating whether reselecting other cells at the frequency at which the specific cell is positioned is permitted through system information.

That is, when cells 1, 2, and 3 are present in an F1 frequency band, the terminal may detect the serious problem during the RRC connection establishment procedure with cell 1. In this case, the network may announce whether the terminal is permitted to reselect cells 2 and 3 during the cell reselection procedure to the indicator transmitted through the system information. The indicator is referred to as an intra frequency reselection indicator (IFRI).

Meanwhile, the intra frequency reselection indicator (IFRA) broadcasted by a cell with which the terminal attempts the RRC connection establishment may be disregarded. In other words, when the terminal detects the serious problem during the RRC connection establishment procedure with the specific cell, even though the IFRI permits reselecting other cells at which the specific cell is positioned, the terminal may exclude other cells at the frequency at which the specific cell is positioned from the candidate cell of the cell reselection.

Additionally, when the terminal detects the serious problem during the RRC connection establishment procedure with the specific cell apart form the intra frequency reselection indicator (IFRI), the network may broadcast the indicator permits reselecting other cells of the frequency at which the specific cell is positioned from the cell through the system information.

When the terminal detects the serious problem during the RRC connection establishment procedure with the cell, the terminal may not regard the cell as the candidate cell during the cell reselection procedure. Further, only when there is at least one other frequency signaled by the system information or a dedicated signal, which may be regarded as a candidate frequency during the cell reselection procedure as a frequency other than the frequency (F1) at which the cell is positioned, even other cells of the F1 frequency may not be regarded as the candidate cell during the cell reselection procedure. That is, only when the terminal knows at least one other candidate frequency during the cell reselection procedure, the terminal excludes the F1 frequency during the cell reselection procedure.

In this case, the intra frequency reselection indicator (IFRA) broadcasted by a cell with which the terminal attempts the RRC connection establishment may be disregarded. In other words, when the terminal detects the serious problem during the RRC connection establishment procedure with the specific cell, even though the IFRI permits reselecting other cells at which the specific cell is positioned, the terminal excludes other cells at the frequency at which the specific cell is positioned from the candidate cell of the cell reselection.

The terminal may exclude other cells at the frequency at which the specific cell is positioned from the candidate cell of the cell reselection only for a limited time. The limited time may be a predetermined value or a value set by the network.

Figure 9:
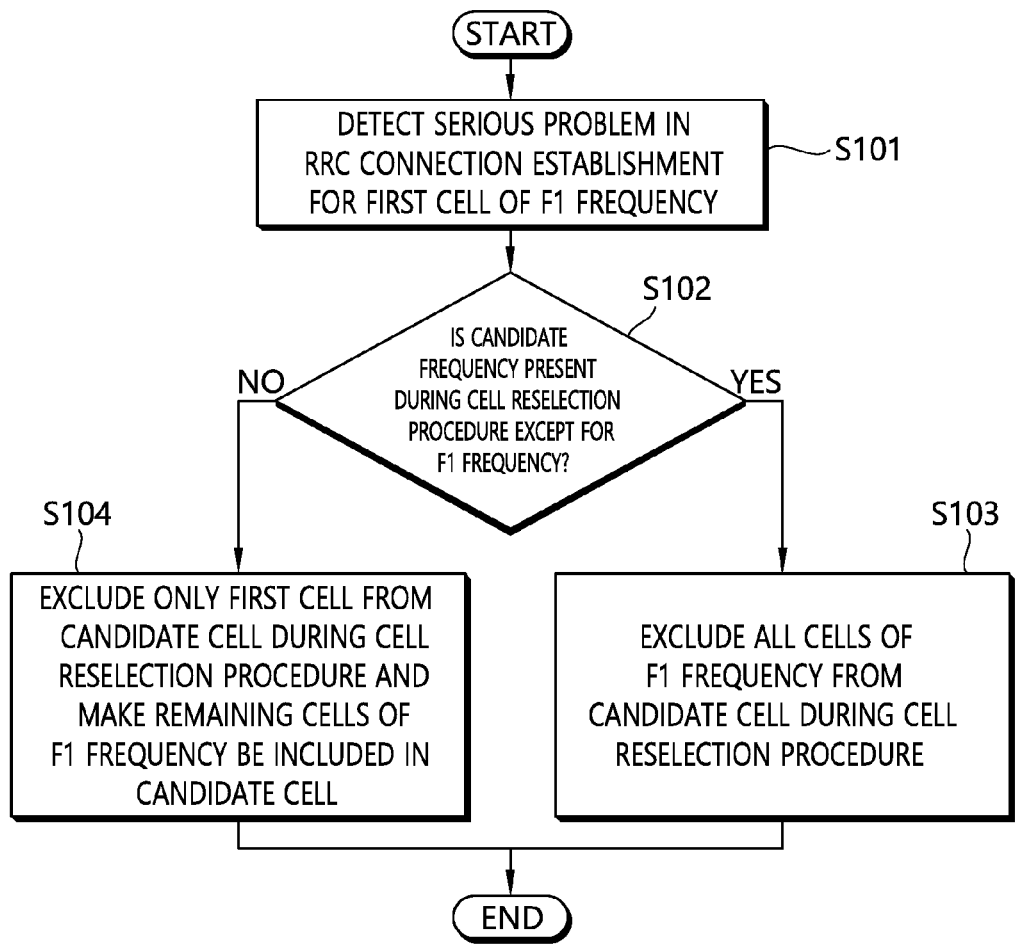
FIG. 9 illustrates a method according to a first embodiment.

FIG. 9 illustrates a method according to a first embodiment.

Referring to FIG. 9, the terminal detects the serious problem in the RRC connection establishment for a first cell of the F1 frequency (S101). The terminal determines whether the candidate frequency is present during the cell reselection procedure except for the F1 frequency (S102) and if the candidate frequency is present, the terminal excludes all cells at the F1 frequency from the candidate cell during the cell reselection procedure (S103) and if not, the terminal excludes only the first cell from the candidate cell during the cell reselection procedure and makes remaining cells at the F1 frequency be include din the candidate cell (S104).

Thereafter, the cell reselection procedure may be performed.

In second to seventh embodiments given below, it is premised that the terminal detects the serious problem during the RRC connection establishment procedure with the specific cell. In this case, the terminal may apply any one of the second to seventh embodiments for RRC connection by performing cell reselection of cells at frequencies (frequencies having other priorities) other than the frequency at which the specific cell is positioned.

Hereinafter, a concerned frequency means the frequency at which the specific cell is positioned when the terminal detects the serious problem during the RRC connection establishment procedure with the specific cell.

Second Embodiment

In the second embodiment, when the serious problem occurs during the RRC connection procedure with the specific cell, the terminal may be regarded to have a lowest priority which a network may signal with respect to a concerned frequency. That is, the terminal may deprioritize the existing given priority with respect to the concerned frequency and regard the network to have the lowest priority to perform signaling.

During the cell reselection procedure to which the deprioritization may be applied, the terminal does not continuously apply the deprioritization but may apply the deprioritization according to whether a specific condition is satisfied or information/configuration provided by the network.

For example, when at least one of following conditions is satisfied, the concerned frequency may be deprioritized.

1) On/Off Indication.

The network may transmit an on/off indicator through the system information or a dedicated signal for the terminal. The on/off indicator may indicate whether the terminal applies the deprioritization to the concerned frequency.

When the on/off indicator is not present with respect to the concerned frequency or the on/off indicator indicates that the deprioritization is not applied, the terminal applies the existing given normal priority to the concerned frequency. On the contrary, when the on/off indicator applies the deprioritization, the terminal may be regarded to have the lowest priority which the network may signal with respect to the concerned frequency.

2) Serving Cell Measurement Based On/Off.

The network may configure under which condition the terminal is to apply the deprioritization with the concerned frequency. For example, the network may configure a threshold to the terminal. When the threshold is provided to the terminal, a serving cell measurement result is compared with the threshold and when the serving cell measurement result is higher than the threshold, the terminal may apply the deprioritization and if not, the terminal may not apply the deprioritization. The threshold may be reference signal received power (RSRP) or reference signal received quality (RSRQ) for the serving cell.

Of course, the example is not limited and an example contrary thereto may be applied. That is, if the serving cell measurement result is higher than the threshold, the deprioritization may not be applied and if not, the deprioritization may be applied.

The network provides a threshold to determine whether to apply the deprioritization to the concerned frequency and the terminal compares the threshold and the measurement result for the serving cell with each other to determine whether to apply the deprioritization.

3) Random Number Based On/Off

The network provides the threshold required to determine whether to apply the deprioritization to the concerned frequency. The threshold may be provided through the system information or the dedicated signal for the terminal. When the terminal receives the threshold, the terminal selects a random number within a predetermined range and thereafter, compares the selected random number and the threshold to deprioritize the concerned frequency when a specific condition is satisfied.

For example, the terminal selects one predetermined number among numbers of 0 to 1 and compares the selected number with the threshold. It is assumed that the threshold is 0.7 and the selected number is 0.6. When the selected number is larger than the threshold, the terminal applies the deprioritization and when the selected number is equal to or less than the threshold, the terminal does not apply but applies the existing normal priority signaled by the network to the concerned frequency.

The conditions of 1) to 3) are separately described for easy description, but may be combined and applied. For example, only when 1) the on/off indicator indicates application of the deprioritization and 3) the selected random number is larger than the threshold, it may be determined that the deprioritization is applied.

Meanwhile, when it is determined that the deprioritization is applied, how long the deprioritization is applied needs also be determined. A time interval in which the deprioritization is applied may be signaled through the system information or the dedicated signal for the terminal. Alternatively, the time interval in which the deprioritization is applied may be predetermined.

The terminal starts a timer when applying the deprioritization and when the timer is terminated, the terminal may apply the original priority without the application of the deprioritization.

Figure 10:
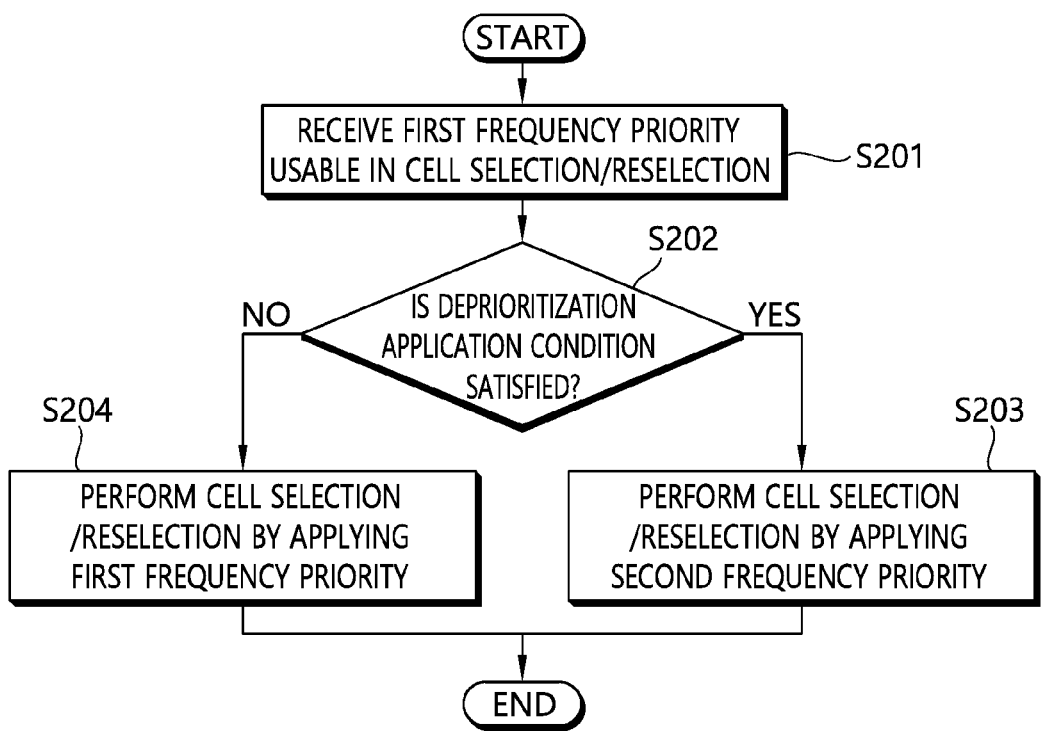
FIG. 10 illustrates a method according to a second embodiment.

FIG. 10 illustrates a method according to a second embodiment.

Referring to FIG. 10, the terminal receives a first frequency priority which may be used for cell selection/reselection from the network (S201). The first frequency priority is a priority of frequencies which the terminal uses for the cell selection/reselection. For example, it is assumed that available frequencies are f1, f2, and f3. In this regard, the first frequency priority may be given in the order of f2, f1, and f3 when the first frequency priority is earlier given to a frequency having a higher priority.

The terminal determines whether a deprioritization condition is satisfied (S202). The deprioritization condition will be described below.

When the deprioritization condition is satisfied, the terminal applies a second frequency priority to perform the cell selection/reselection (S203). When the corresponding frequency is f2, the second frequency priority is achieved by applying the deprioritization to the first frequency priority and may be, for example, the order of f1, f3, and f2.

When the deprioritization condition is not satisfied, the terminal applies the first frequency priority to perform the cell selection/reselection (S204).

Third Embodiment

Figure 11:
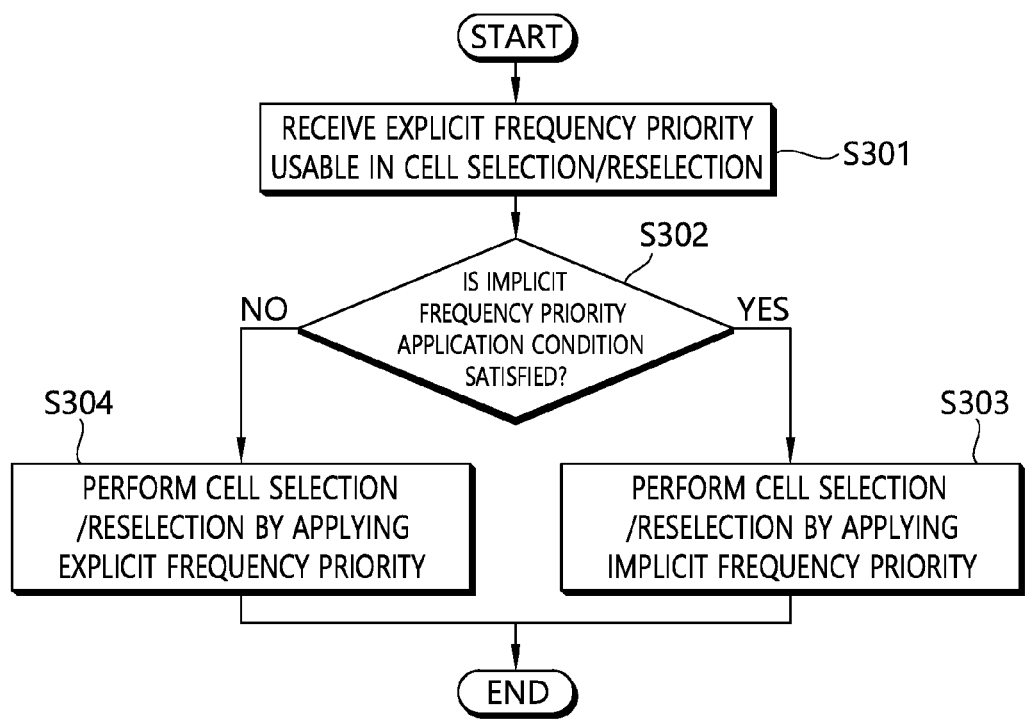
FIG. 11 illustrates a cell selection/reselection method according to a third embodiment.

FIG. 11 illustrates a cell selection/reselection method according to a third embodiment.

Referring to FIG. 11, the terminal receives an explicit frequency priority which may be used for the cell selection/reselection from the network (S301). The explicit frequency priority is a priority explicitly given by the network as the priority of the frequencies which the terminal uses for the cell selection/reselection.

The terminal determines whether an implicit frequency priority application condition is satisfied (S302). The implicit frequency priority application condition will be described below.

When the implicit frequency priority application condition is satisfied, the terminal applies an implicit frequency priority to perform the cell selection/reselection (S303). When the implicit frequency priority application condition is not satisfied, the terminal applies the explicit frequency priority to perform the cell selection/reselection (S304).

In the case of the implicit frequency priority, when it is assumed that the explicit frequency priority of the corresponding frequency is a highest priority, a priority of a frequency having a priority lower than the explicit frequency priority of the corresponding frequency is applied to the corresponding frequency. For example, in the case of the implicit frequency priority, when it is assumed that the explicit frequency priority of the corresponding frequency is the highest priority, a priority of a frequency having the second highest priority is applied to the corresponding frequency.

For example, it is assumed that the available frequencies are f1, f2, f3, and f4. In this regard, the explicit frequency priority may be given in the order of f2, f1, f3, and f4 when the explicit frequency priority is earlier given to a frequency having a higher priority. It is assumed that the terminal camps on a cell of f1.

In this case, when the implicit frequency priority application condition is satisfied, the terminal regards a priority of the f1 to be the same as a priority of a frequency having an immediately next priority of the f1, that is, f3. Thereafter, the terminal determines cell reselection between inter-frequencies having the same priority with respect to f1 and f3.

Even in a to which the implicit frequency priority may be applied, the terminal does not continuously apply the implicit frequency priority but may determine whether to apply the implicit frequency priority according to whether a specific condition is satisfied or information/configuration provided by the network.

For example, when at least one of following conditions is satisfied, the implicit frequency priority may be applied to the corresponding frequency.

1) On/Off Indication

A network may transmit an on/off indicator through system information or a dedicated signal for UE. The on/off indicator may be indicative of whether the UE will apply an implicit frequency priority to a related frequency or not.

If an on/off indicator is not present for a corresponding frequency or an on/off indicator is indicative that an implicit frequency priority is not applied, UE may apply an explicit frequency priority to the corresponding frequency. In contrast, if the on/off indicator is indicative that the implicit frequency priority is applied, the UE applies the implicit frequency priority to the corresponding frequency.

2) Serving Cell Measurement-Based On/Off

A network may configure whether UE will apply an implicit frequency priority under which condition. For example, the network may configure a threshold for the UE. When the threshold is provided, the UE may compare the threshold with a result of measurement for a serving cell. If the result of the measurement for the serving cell is higher than the threshold, the UE may apply the implicit frequency priority. If not, the UE may not apply the implicit frequency priority. The threshold may be reference signal received power (RSRP) or reference signal received quality (RSRQ) for the serving cell. The above example does not have any limit, and the opposite may be applied. That is, if the result of the measurement for the serving cell is higher than the threshold, the UE may not apply the implicit frequency priority. If not, the UE may apply the implicit frequency priority.

3) Random Number-Based On/Off

A network provides a threshold required to determine whether or not to apply an implicit frequency priority to a corresponding frequency. The threshold may be provided through system information or a dedicated signal for UE. When receiving the threshold, the UE may select a random number within a specific range, may compare the selected random number with the threshold, and may apply the implicit frequency priority if a specific condition is satisfied.

For example, the UE selects any number of numbers 0 to 1 and compares the selected number with the threshold. It is assumed that the threshold is 0.7 and the selected number is 0.6. If the selected number is greater than the threshold, the UE applies the implicit frequency priority. If the selected number is the threshold or less, the UE may apply an explicit frequency priority without applying the implicit frequency priority, and the vice versa.

The 1) to 3) conditions have been separately described, for convenience sake, but may be combined and applied.

Meanwhile, when it is determined that an implicit frequency priority is applied, it also needs to determine how long will it be applied. A time interval in which the implicit frequency priority is applied may be signaled through system information or a dedicated signal for UE. Alternatively, the time interval in which the implicit frequency priority is applied may be predetermined.

The UE may start a timer when applying the implicit frequency priority, and may apply an explicit frequency priority without applying the implicit frequency priority when the timer expires.

Fourth Embodiment

Figure 12:
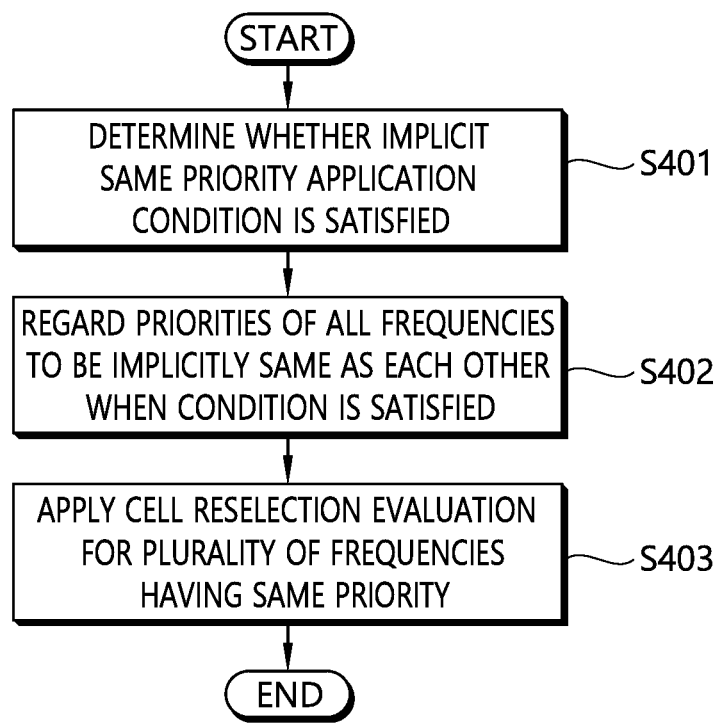
FIG. 12 illustrates a selection/reselection method of a terminal according to a fourth embodiment.

FIG. 12 illustrates a selection/reselection method of a terminal according to a fourth embodiment.

Referring to FIG. 12, the terminal determines whether an implicit same priority application condition is satisfied (S401). The condition will be described below.

When the condition is satisfied, the terminal regards priorities of all frequencies to be implicitly the same as each other (S402). When the implicit same priority application condition is not satisfied, the terminal applies the existing frequency priority to perform the cell selection/reselection.

The terminal applies cell reselection evaluation for a plurality of frequencies having the same priority (S403).

The terminal receives the existing priority with respect to all frequencies including the corresponding frequency and thereafter, regards all of the frequencies to explicitly have the same priority and performs the cell reselection procedure when a specific condition is satisfied.

Although this method may be applied to the cell selection/reselection with respect to a specific cell, this method is not continuously applied to the cell selection/reselection but the method may be applied when a specific condition is satisfied or according to the network information/configuration.

The implicit same priority application condition is described below.

1) On/Off Indication

A network may transmit an on/off indicator through system information or a dedicated signal for UE. The on/off indicator may be indicative of whether the UE will apply an implicit same priority to all of frequencies including a related frequency.

If an on/off indicator is not present or the on/off indicator is indicative that the implicit same priority does not need to be applied, the UE may apply an existing frequency priority to a corresponding frequency. In contrast, if the on/off indicator is indicative that the implicit same priority needs to be applied, the UE considers the corresponding frequency to have the same priority as another frequency and performs cell selection/reselection.

2) Serving Cell Measurement-Based On/Off

A network may configure whether UE will apply an implicit same priority to all of frequencies under which condition. For example, the network may configure a threshold to the UE. When the threshold is provided, the UE may compare the threshold with a result of measurement for a serving cell. If the result of the measurement for the serving cell is higher than the threshold, the UE may apply the implicit same priority to all the frequencies. If not, the UE may not apply the implicit same priority. The threshold may be reference signal received power (RSRP) or reference signal received quality (RSRQ) for the serving cell. The above example does not have any limit, and the opposite may be applied. That is, if the result of the measurement for the serving cell is higher than the threshold, the UE may not apply the implicit same priority. If not, the UE may apply the implicit same priority.

3) Random Number-Based On/Off.

A network provides a threshold required to determine whether or not to apply an implicit same priority to a corresponding frequency. The threshold may be provided through system information or a dedicated signal for UE. When receiving the threshold, the UE selects a random number within a specific range, compares the selected random number with the threshold, and applies the implicit same priority if a specific condition is satisfied.

For example, the UE selects any number of numbers 0 to 1 and compares the selected number with the threshold. It is assumed that the threshold is 0.7 and the selected number is 0.6. If the selected number is greater than the threshold, the UE may apply the implicit same priority. If the selected number is the threshold or less, the UE may apply an existing frequency priority signaled by the network without applying the implicit same priority, and the opposite may be applied.

The 1) to 3) conditions have been separately described, for convenience sake, but may be combined and applied.

Meanwhile, when it is determined that an implicit same priority is applied to all of frequencies, it also needs to determine how long will it be applied. A time interval in which the implicit same priority is applied may be signaled through system information or a dedicated signal for UE. Alternatively, the time interval in which the implicit same priority is applied may be predetermined.

The UE starts a timer when applying the implicit same priority and may apply an existing frequency priority without applying the implicit same priority when the timer expires.

Fifth Embodiment

Figure 13:
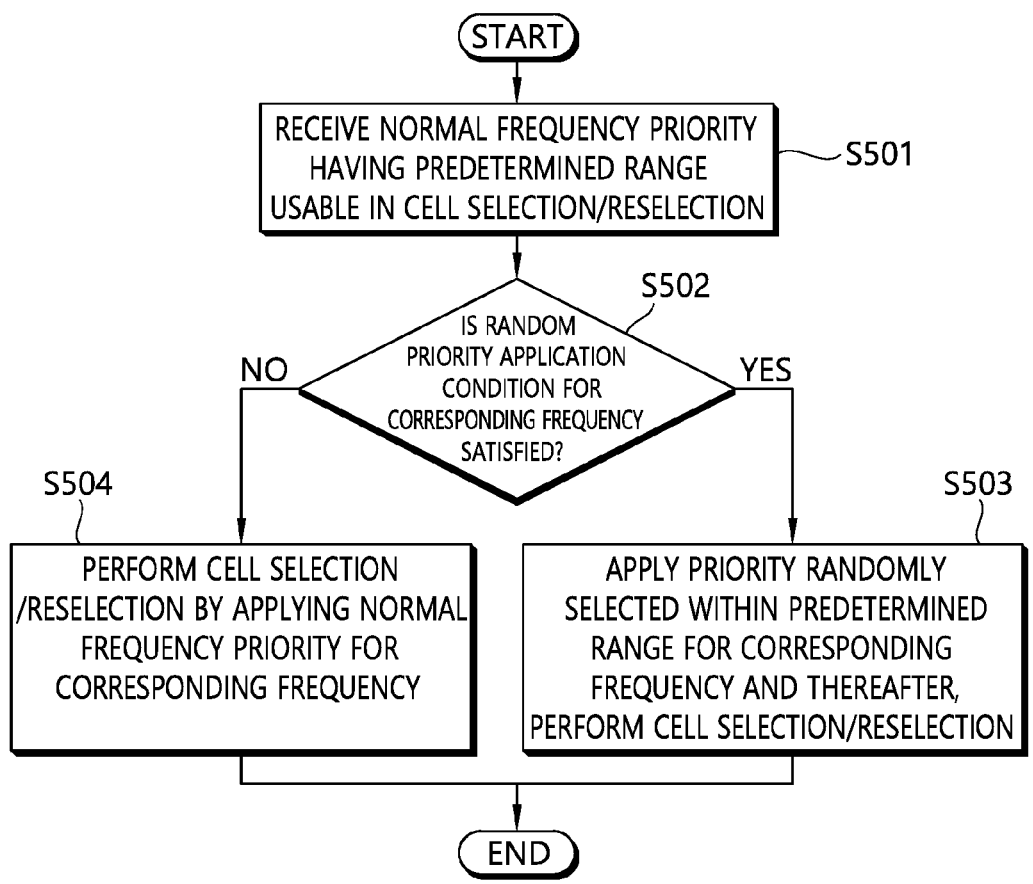
FIG. 13 illustrates a cell selection/reselection method according to a fifth embodiment.

FIG. 13 illustrates a cell selection/reselection method according to a fifth embodiment.

Referring to FIG. 13, the terminal receives a normal frequency priority having a predetermined range, which may be used for the cell selection/reselection (S501).

The terminal determines whether a random priority application condition is satisfied with respect to the corresponding frequency (S502). The random priority application condition will be described below.

When the random priority application condition is satisfied, the terminal applies a priority randomly selected within the predetermined range and thereafter, performs the cell selection/reselection (S503). For example, when the normal frequency priority is given in a range between 0 and 7, the terminal randomly selects one priority within the range between 0 and 7 with respect to the corresponding frequency. That is, the range of the priority value which may be randomly selected with respect to the corresponding frequency may be determined to be the same as a range of the normal frequency priority provided through the system information.

When the random priority application condition is not satisfied, the terminal applies the normal frequency priority to the corresponding frequency to perform the cell selection/reselection (S504).

The random priority application condition is described below.

1) On/Off Indication

A network may transmit an on/off indicator through system information or a dedicated signal for UE. The on/off indicator may be indicative of whether the UE will apply random priority to a corresponding frequency.

If an on/off indicator is not present or the on/off indicator is indicative that the random priority does not need to be applied, the UE may apply a normal frequency priority to the corresponding frequency.

2) Serving Cell Measurement-Based On/Off

A network may configure whether UE will apply random priority to a corresponding frequency under which condition. For example, the network may configure a threshold for the UE. When the threshold is provided, the UE compares the threshold with a result of measurement for a serving cell.

If the result of the measurement for the serving cell is higher than the threshold, the UE may apply the random priority to the corresponding frequency. If not, the UE may not apply the random priority. The threshold may be reference signal received power (RSRP) or reference signal received quality (RSRQ) for the serving cell. The above example does not have any limit, and the opposite may be applied. That is, if the result of the measurement for the serving cell is higher than the threshold, the UE may not apply the random priority. If not, the UE may apply the random priority.

3) Random Number-Based On/Off

A network may provide a threshold required to determine whether or not to apply random priority to a corresponding frequency. The threshold may be provided through system information or a dedicated signal for UE. When receiving the threshold, the UE selects a random number within a specific range, compares the selected random number with the threshold, and applies the random priority if a specific condition is satisfied.

For example, the UE selects any number of numbers 0 to 1 and compares the selected number with the threshold. It is assumed that the threshold is 0.7 and the selected number is 0.6. If the selected number is greater than the threshold, the UE may apply the random priority. If the selected number is the threshold or less, the UE may apply the normal frequency priority signaled by the network without applying the random priority, and the opposite may be applied.

The 1) to 3) conditions have been separately described, for convenience sake, but may be combined and applied.

Meanwhile, when it is determined that random priority is applied to a corresponding frequency, it also needs to determine how long will it be applied. A time interval in which the random priority is applied may be signaled through system information or a dedicated signal for UE. Alternatively, the time interval in which the random priority is applied may be predetermined.

The UE may start a timer when applying the random priority, and may apply the normal frequency priority signaled by the network without applying the random priority when the timer expires.

Sixth Embodiment

Figure 14:
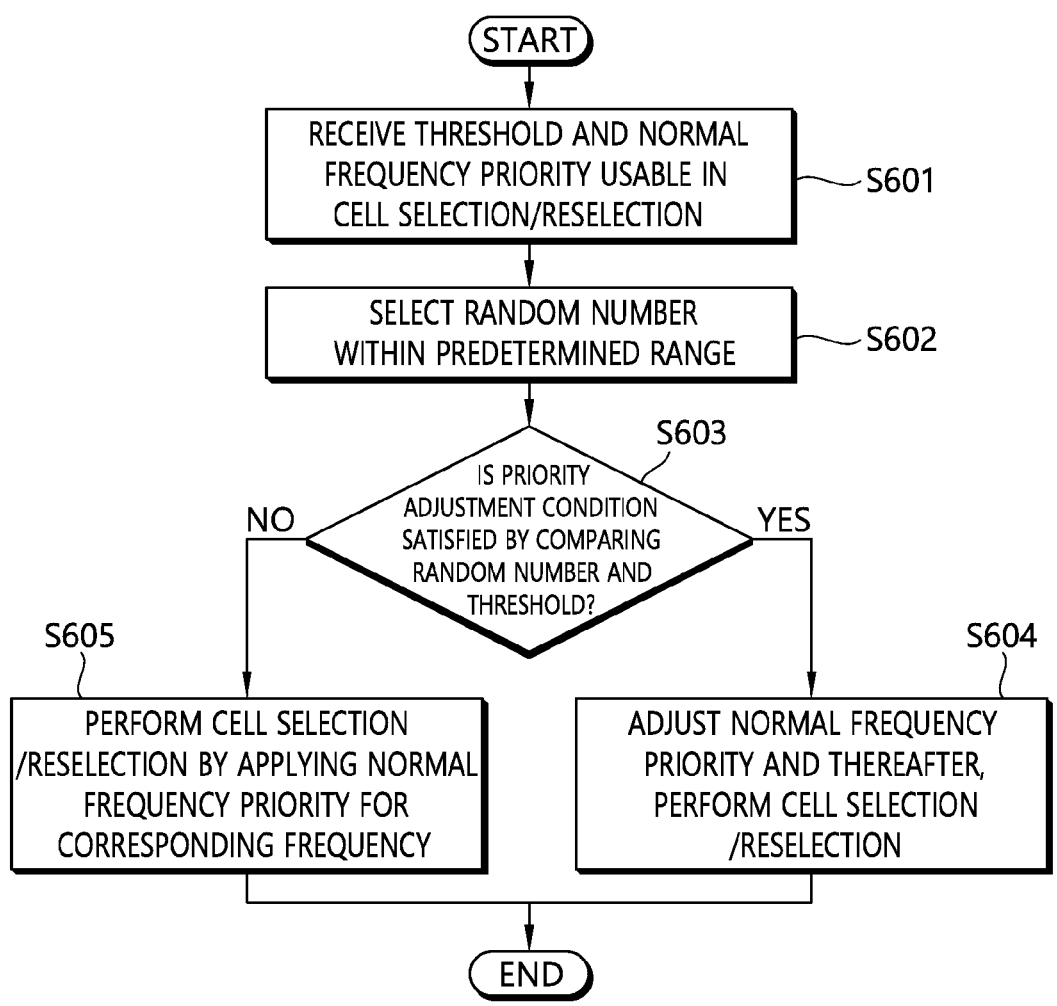
FIG. 14 illustrates a cell selection/reselection method according to a sixth embodiment.

FIG. 14 illustrates a cell selection/reselection method according to a sixth embodiment.

Referring to FIG. 14, the terminal receives the threshold and the normal frequency priority which may be used for the cell selection/reselection from the network (S601). The threshold may be given with respect to the corresponding frequency and provided through the system information or the dedicated signal for the terminal.

The terminal selects the random number within a predetermined range (S602). The terminal determines whether a priority adjustment condition is satisfied by comparing the random number and the threshold (S603).

When the priority adjustment condition is satisfied, the terminal adjusts the normal frequency priority and thereafter, performs the cell selection/reselection (S604). When the priority adjustment condition is not satisfied, the terminal applies the normal frequency priority to the corresponding frequency to perform the cell selection/reselection (S605).

For example, the terminal randomly selects one number among numbers of 0 to 1 and compares the selected number with the threshold. It is assumed that the threshold is 0.7 and the selected number is 0.6. When the selected number is smaller than the threshold, the terminal may adjust the normal frequency priority and when the selected number is equal to or more than the threshold, the terminal may not adjust the normal frequency priority.

The normal frequency priority may be adjusted according to one of two following methods.

1) When the normal frequency priority which the network signals with respect to the corresponding frequency is p, the adjusted priority may be (P+P_adj). Herein, P_adj as a priority adjustment value may be a value provided by the network or a predetermined value.

2) When the normal frequency priority which the network signals with respect to the corresponding frequency is p, the adjusted priority may be (P+P_adj*random value). Herein, P_adj as the priority adjustment value may be the value provided by the network or the predetermined value and random value as a value randomly selected by the terminal may be the random number in step S502 or a randomly selected value apart from the random number.

As conditions for adjusting the priority, at least one among following conditions may be satisfied.

1) On/Off Indication.

When the network signals both the threshold described in the sixth embodiment and a related parameter (e.g., P_adj), the terminal may regard the priority adjustment to be required. On the contrary, if even some of the required threshold and related parameter are not provided, the terminal may regard the priority adjustment to be not required.

2) Serving Cell Measurement Based On/Off.

The network may configure under which condition the terminal is to apply the priority adjustment with the concerned frequency. For example, the network may configure the threshold to the terminal. When the threshold is provided to the terminal, the serving cell measurement result is compared with the threshold and when the serving cell measurement result is higher than the threshold, the terminal may the operations of S502 and S503 described above and if not, the terminal may not perform the operations of S502 and S503 described above. The threshold may be reference signal received power (RSRP) or reference signal received quality (RSRQ) for the serving cell. Of course, the example is not limited and an example contrary thereto may be applied.

Meanwhile, the priority adjustment may be handled to be valid only for a predetermined time. The predetermined may be provided by the network through the system information or the dedicated signal for the terminal or be a predetermined time.

The terminal starts a validity timer at the time of starting a procedure of adjusting the priority for the concerned frequency. In addition, when the validity timer is terminated after the predetermined time, the priority for the corresponding frequency is restored to the normal frequency priority. That is, when the validity timer is terminated, the priority adjustment value becomes 0.

The network may configure an additional constraint condition in the priority adjustment. For example, the network may configure the threshold to the terminal. When the threshold is provided to the terminal, the serving cell measurement result is compared with the threshold and when the serving cell measurement result is higher than the threshold, the terminal may the operation according to the sixth embodiment and if not, the terminal may not perform the operation according to the sixth embodiment.

Seventh Embodiment

When a network provides notification that idle mode redistribution is required through system information or a dedicated signal for UE, the UE may not take into consideration a result of measurement for a serving cell in cell reselection evaluation for frequencies having low priority.

Figure 15:
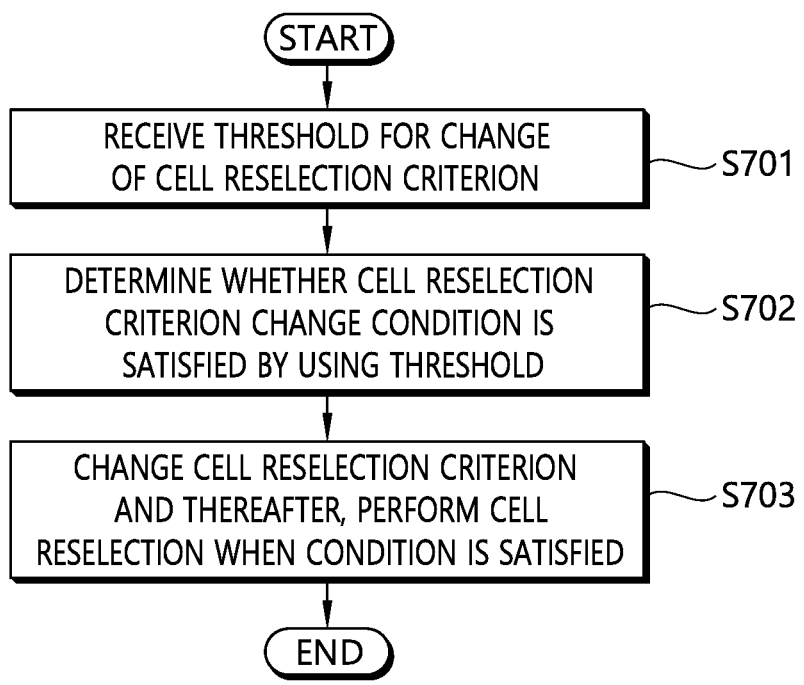
FIG. 15 illustrates a cell reselection method according to a sixth embodiment.

FIG. 15 illustrates a cell reselection method according to a sixth embodiment.

Referring to FIG. 15, UE receives a threshold for a cell reselection criterion change (S701). The UE determines whether the cell reselection criterion change condition is satisfied using the threshold (S702). If the cell reselection criterion change condition is satisfied, the UE changes a cell reselection criterion and then performs cell reselection (S703).

When receiving the threshold, the UE selects a random number within a specific range and then compares the selected random number with the threshold. If a specific condition is satisfied, the UE changers the cell reselection criterion. For example, the UE may select any number of numbers 0 to 1 and compare the selected number with the threshold. It is assumed that the threshold is 0.7 and the selected number is 0.6. If the selected number is smaller than the threshold, the UE changes the cell reselection criterion. If the selected number is equal to or greater than the threshold, the UE does not change the cell reselection criterion, and the opposite may be applied.

A detailed example of changing a cell reselection criterion is described below.

If the lowest quality threshold 'threshServingLowQ' of a serving cell is provided in a system information block, cell reselection in an E-URTRN frequency or inter-RAT frequency having lower priority than a current serving frequency is performed if 1) an E-UTRAN or UTRAN FDD RAT/frequency having low priority satisfies Squal>$Thresh_{X,LowQ}$ for a $Treselection_{RAT}$ time interval or 2) an UTRAN TDD, GERAN, or CDMA2000 RAT/frequency having low priority satisfies Srxlev>$Thresh_{X,LowP}$ for a $Treselection_{RAT}$ time interval and 3) UE has camped on a serving cell for 1 second or more. $Thresh_{X,LowQ}$ may be the lowest quality threshold of a cell, and $Thresh_{X,LowP}$ may be the lowest received power threshold of a cell.

In a related art, the 1) and 2) conditions include a condition in which a serving cell needs to satisfies Squal<$Thresh_{Serving,LowQ}$, but in the present invention, a cell reselection criterion is changed by deleting the condition. That is, in a related art, only when the quality of a serving cell is poorer than the lowest quality threshold and the quality of another frequency having lower priority than a serving cell is better than a specific threshold, cell reselection is performed on a cell of another frequency having low priority. In contrast, in the present invention, if the quality of another frequency having low priority is good regardless of the quality of a serving cell, a cell reselection criterion is changed so that cell reselection is performed on another frequency having low priority.

In contrast, if the lowest quality threshold 'threshServingLowQ' of a serving cell is not provided in a system information block, cell reselection in an E-UTRAN frequency or inter-RAT frequency having lower priority than a current serving frequency is performed if 1) an RAT/frequency having low priority satisfies Srxlev>$Thresh_{X,LowP}$ for a $Treselection_{RAT}$ time interval and 2) UE has camped on a serving cell for 1 second or more. In a related art, the 1) condition includes a condition in which a serving cell needs to satisfies Srxlev<$Thresh_{Serving,LowP}$, but in the present invention, a cell reselection criterion is changed by deleting the condition.

A network may signal an offset offset_Q added to $Thresh_{X,LowQ}$ or an offset offset_P added to $Thresh_{X,LowP}$. If such an offset is signaled, the aforementioned cell reselection criterion may be changed as follows.

If the lowest quality threshold 'threshServingLowQ' of a serving cell is provided in a system information block, cell reselection in an E-URTRN frequency or inter-RAT frequency having lower priority than a current serving frequency is performed if 1) an E-UTRAN or UTRAN FDD RAT/frequency having low priority satisfies Squal>$Thresh_{X,LowQ}$+offset_Q for a $Treselection_{RAT}$ time interval or 2) an UTRAN TDD, GERAN, or CDMA2000 RAT/frequency having low priority satisfies Srxlev>$Thresh_{X,LowP}$+offset_Q for a $Treselection_{RAT}$ time interval and 3) UE has camped on a serving cell for 1 second or more.

If the lowest quality threshold 'threshServingLowQ' of a serving cell is not provided in a system information block, cell reselection in an E-UTRAN frequency or inter-RAT frequency having lower priority than a current serving frequency is performed if 1) an RAT/frequency having low priority satisfies Srxlev>$Thresh_{X,LowP}$+offset_P for a $Treselection_{RAT}$ time interval and 2) UE has camped on a serving cell for 1 second or more.

Eighth Embodiment

In the eighth embodiment, when the terminal detects the serious problem during the RRC connection establishment procedure for the cell, the terminal may apply not the existing ACB parameter set (first ACB parameter but another ACB parameter set (second ACB parameter) for access class barring (ACB). The case where the serious problem occurs in the RRC connection establishment for the specific cell as described above may correspond to a case where the number of failure times of the RRC connection establishment is more than a predetermined number of times (N), a case where the RRC connection establishment is unsuccessful consecutively N times, a case where the RRC connection establishment is unsuccessful consecutively N times for a predetermined time, a case where the RRC connection establishment is unsuccessful accumulatively N times for a predetermined time, a case where all RRC connection establishment procedures are unsuccessful for a predetermined after the RRC connection establishment for the cell is unsuccessful at first, and the like. Herein, N may be a predetermined value or a value set by the network.

First, the access class barring (ACB) is described.

The terminal may obtain a right to preferentially access a wireless access network by using an ACB mechanism. The ACB mechanism may provide an access priority to the terminal based on an allocated access class. That is, when the terminal belongs to any one of peculiar access classes, the corresponding terminal may preferentially access the network in a congestion situation as compared with other terminals.

When the terminal is a member of any one access class corresponding to a permitted class and the access class is applicable in a serving network, an access attempt may be permitted. If not, the access attempt is not permitted. Further, although a common access is permitted, the serving network may indicate the terminal to be limited to perform local registration. When the terminal responds to paging, the terminal may follow a generally defined procedure.

Requirements for applying the ACB are described below.
  The serving network broadcasts mean duration of access control and barring rate commonly applied to access classes 0 to 9 to the terminal. This may be applied similarly even to access classes 11 to 15.

The network may support the access control based on a type of the access attempt. The network may combine the access control based on the types of the access attempts such as mobile originating (MO), mobile terminating, and location registration. ACB parameters such as the mean duration of access control and the barring rate may be broadcasted with respect to each access attempt type.

The terminal determines a barring status based on the ACB parameters provided from the serving network and performs the resulting access attempt. The terminal generates a random number between 0 and 1 when initializing a connection configuration and compares the generated random number with current barring rate to determine whether the terminal is barred. When the random number is smaller than the barring rate and the type of the access attempt is permitted, the access attempt may be permitted. If not, the access attempt is not permitted. When the access attempt is not permitted, an additional access attempt depending on the same type is barred for specific duration calculated based on the mean duration of access control.

When a NAS layer of the terminal requests RRC connection, a layer of RRC of the terminal performs the ACB and only when the RRC layer passes through the ACB, the RRC layer transmits an RRC connection request message to the base station through a random access procedure. In order to perform the ACB, the RRC layer of the terminal may obtain the ADB parameter through system information broadcasted by the cell. The ACB parameter may include different barring times and barring factors with respect to different RRC establishment causes. The system information to transmit the ACB parameter may be SIB2. Hereinafter, the ACB parameters such as the barring time, the barring factor, and the like are referred to as the existing ACB parameter.

When the NAS layer of the terminal requests the RRC connection, the base station announces the RRC establishment cause and the RRC layer of the terminal performs the ACB by using the barring time and the barring factor corresponding to the RRC establishment cause. When the RRC layer of the terminal performs the ACB, the RRC layer of the terminal may generate the random number and compare the generated random number with the barring factor, and determine whether to perform barring according to whether the generated random number value is larger than the barring factor. When the barring is performed, the terminal may not transmit the RRC connection request message for the barring time.

In the eighth embodiment, when the terminal detects the serious problem during the RRC connection establishment procedure for the cell, the terminal may apply not the existing ACB parameter set (first ACB parameter but another ACB parameter set for the access class barring (ACB). Hereinafter, not the existing ACB parameter but another ACB parameter is referred to as type 2 ACB parameter (second ACB parameter). The type 2 ACB parameter may be a parameter that increases an access barring probability for the cell as compared with the existing ACB parameter. For example, the type 2 ACB parameter the barring factor and the barring time that increase the access barring probability for the cell.

Meanwhile, the second ACB parameter may be applied only when following specific conditions are satisfied. The specific condition may be nay one of the following conditions.

1. The network may provide the type 2 ACB parameter. For example, the network may provide the type 2 ACB parameter by the system information. When the terminal receives the type 2 ACB parameter, the terminal may use not the existing ACB parameter but the type 2 ACB parameter. That is, providing the type 2 ACB parameter becomes the condition.

2. The network may provide an ACB parameter correction value. That is, not a new ACB parameter which substitutes for the existing ACB parameter but a correction value for the existing ACB parameter is provided.

When the ACB parameter correction value is provided, the terminal applies the ACB parameter correction value for changing the existing ACB parameter to correct the existing ACB parameter value.

For example, the ACB parameter correction value may be provided with respect to the barring times and the barring factors given with respect to different RRC establishment causes, respectively. The ACB parameter after applying the ACB parameter correction value to the existing ACB parameter is referred to as a corrected ACB parameter. Then, the corrected ACB parameter may include a value acquired by subtracting the ACB parameter correction value from the existing barring factor, a value acquired by adding the ACB parameter correction value to the barring time, and the like.

When the RRC connection establishment is successful, the terminal applies the existing ACB parameter until the serious problem is detected in the RRC connection establishment after the terminal enters an idle state.

Figure 16:
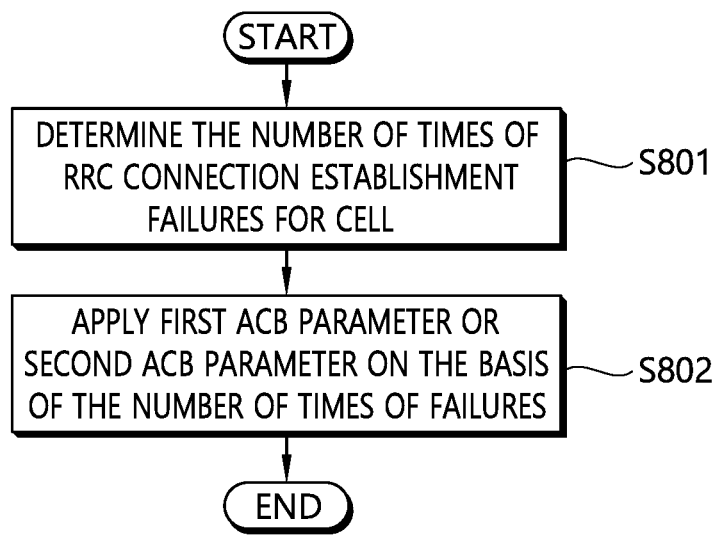
FIG. 16 illustrates a method according to the eighth embodiment.

FIG. 16 illustrates a method according to the eighth embodiment.

Referring to FIG. 16, the terminal determines the number of failure times of the RRC connection establishment for the cell (S801) and applies a first access class barring (ACB) parameter or the second ACB parameter based on the number of failure times (S802). The second ACB parameter may be a parameter that increases the access barring probability for the cell as compared with the first ACB parameter.

Ninth Embodiment

Figure 17:
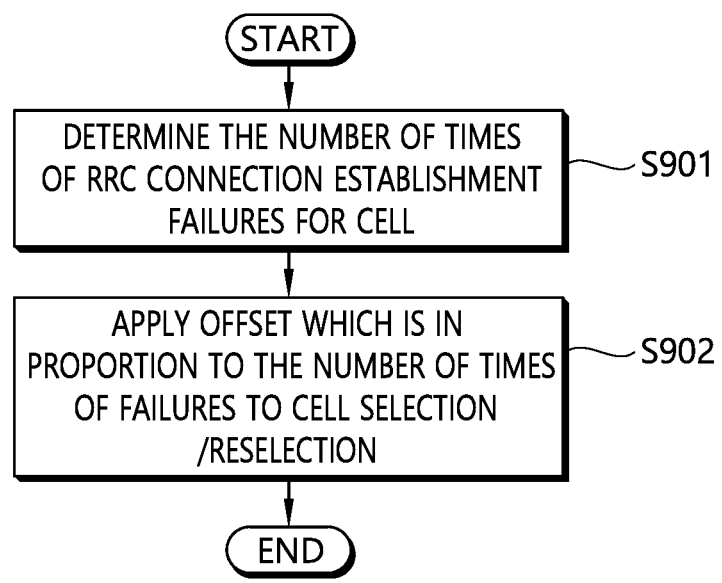
FIG. 17 illustrates a method according to a ninth embodiment.

FIG. 17 illustrates a method according to a ninth embodiment. Referring to FIG. 17, the terminal may determine the number of failure times of the RRC connection establishment for the cell (S901) and the terminal may apply an offset value (an offset value for each cell) which is in proportion to the number of times when a problem is detected in the RRC connection establishment for the cell during the cell selection/reselection procedure (S902).

An offset set used during the existing cell selection/reselection procedure is referred to as an existing offset value and when the terminal detects the problem consecutively N times during the RRC connection establishment procedure for the cell, an offset value for each cell corresponding to N* the existing offset value may be applied during the cell selection/reselection procedure for the cell. Alternatively, the offset value for each cell may be applied only when the terminal detects the problem N times during the RRC connection establishment procedure for the cell during a time interval T (T represents a predetermined value or a value which may be set by the network).

For example, Equation 1 given above, which is used during the cell selection procedure may be modified to Equation 3 given below.

$$Srxlev>0 \text{ AND } Squal>0, \text{ where} \qquad \text{[Equation 3]}$$

$$Srelev = Q_{rxlevmeas} - (Q_{rxlevmin} + N*Q_{rxlevminoffset}) - Pcompensation$$

$$Squal = Q_{qualmeas} - (Q_{qualmin} + N*Q_{qualminoffset})$$

Alternatively, Equation 1 given above may be modified to Equation 4 given below.

$$Srxlev = Q_{rxlevmeas} - (Q_{rxlevmin} + Q_{rxlevminoffset}) - Pcompensation - N*Qoffset_{temp}$$ [Equation 4]

$$Squal = Q_{qualmeas} - (Q_{qualmin} + Q_{qualminoffset}) - N*Qoffset_{temp}$$

That is, whenever the RRC connection establishment for the specific cell is unsuccessful, the offset values are accumulated according to the number of failure times and when the RRC connection establishment is unsuccessful N times, an offset value ($N*Q_{rxlevminoffset}$, $N*Q_{qualminoffset}$) for each cell which is N times larger than the existing offset value or a new offset value ($N*Qoffset_{temp}$) is applied. Since $Q_{rxlevminoffset}$ and $Q_{qualminoffset}$ for the specific cell increase in proportion to the number of failure times of the RRC connection establishment for the specific cell, it is difficult to satisfy conditions of Srxlev>0 and Squal>0. That is, an effect in which the specific cell is barred is achieved.

Further, for example, Equation 2 given above, which is used during the cell reselection procedure may be modified to Equation 5 given below.

$$R_s = Q_{meas,s} + Q_{Hyst} - N*Qoffset_{temp}$$ [Equation 5]

$$R_n = Q_{meas,n} - Qoffset$$

That is, whenever the RRC connection establishment is unsuccessful for a cell on which the terminal camps, $Q_{offset}$ is accumulated and when the RRC connection establishment is unsuccessful N times, $N*Q_{offset}$ is applied. Since the terminal measures $R_s$ of the serving cell and $R_n$ of a neighbor cell, regards a cell having a largest ranking index value as a highest ranked cell, and reselects this cell, when $Q_{offset}$ increases by N times, a probability that the cell on which the terminal camps is to selected during the cell reselection procedure significantly decreases. That is, an effect in which a cell having the problem is barred is achieved.

When the RRC connection establishment is unsuccessful even with respect to the neighbor cell on which the terminal camps previously and the RRC connection establishment is unsuccessful even with respect to a cell on which the terminal camps at present, Equation 5 given above may be modified to Equation 6 given below. In Equation 6, N and M represent the number of failure times of the RRC connection establishment in each cell.

$$R_s = Q_{meas,s} + Q_{Hyst} - N*Qoffset_{temp}$$ [Equation 6]

$$R_n = Q_{meas,n} - Qoffset - M*Qoffset_{temp}$$

The offset value for each cell, which is in proportion to the number of failure times of the RRC connection establishment may be signaled through the broadcasted system information or dedicated signal for each terminal.

Meanwhile, it may be determined that the offset value for each cell is valid only for a limited time. In detail, the offset value for each cell may be first applied to the specific cell and thereafter, applied validly only for a predetermined time. Alternatively, whenever the offset value for each cell is newly applied to the specific cell, a valid time may newly start. That is, the valid time of the offset value for each cell may be determined based on a first application time or whenever the offset for each cell is applied, the valid time of the offset value for each cell may be determined based on the application time.

When the terminal succeeds in the RRC connection establishment procedure with respect to the cell to which the offset value for each cell is applied, the terminal may give up the offset value for each cell and use the existing offset value.

The aforementioned various embodiments may be combinationally used. For example, the eighth embodiment may be applied to the access class barring (ACB) step and the ninth embodiment may be applied to the cell reselection step.

Figure 18:
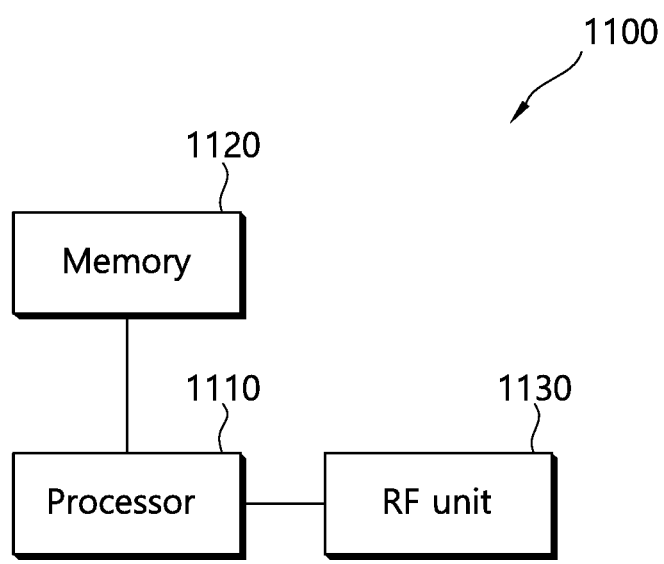
FIG. 18 is a diagram illustrating a configuration of a terminal apparatus according to an embodiment of the present invention.

FIG. 18 is a diagram illustrating a configuration of a terminal apparatus according to an embodiment of the present invention.

Referring to FIG. 18, a terminal (UE) apparatus 1100 includes a processor 1100, a memory 1120, and a radio frequency (RF) unit 1130. The processor 1110 implements a function, a process, and/or a method which are proposed in the first to ninth embodiments. For example, according to the eighth embodiment, the processor 1110 may determine the number of failure times of the RRC connection establishment for the specific cell during the RRC connection establishment procedure with the specific cell and may apply the first ACB parameter or second ACB parameter based on the number of failure times.

The RF unit 1130 is connected with the processor 1110 to transmit and receive a radio signal.

The processor may include an application-specific integrated circuit (ASIC), other chipset, a logic circuit, and/or a data processing device. The memory may include a read-only memory (ROM), a random access memory (RAM), a flash memory, a memory card, a storage medium, and/or another storage device. The RF unit may include a baseband circuit for processing the radio signal. When the embodiments are implemented by software, the aforementioned technique may be implemented by modules (a process, a function, and the like) that perform the aforementioned function. The modules may be stored in the memory and executed by the processor. The memory may be positioned inside or outside the processor and connected with the processor through various well-known means.

What is claimed is:

1. A method for establishing a radio resource control (RRC) connection for a cell of a terminal, the method comprising:
    determining the number of times of failure in RRC connection establishment for the cell; and
    applying a first access class barring (ACB) parameter or a second ACB parameter on the basis of the number of times of the failure,
    wherein the second ACB parameter is a parameter which increases an access blocking probability for the cell in comparison with the first ACB parameter.

2. The method of claim 1, wherein when the number of times of failure is more than a predetermined number (N) of times, the second ACB parameter is applied to the cell.

3. The method of claim 2, wherein the N is a predetermined value or a value set by a network.

4. The method of claim 1, wherein the second ACB parameter is applied to the cell when the RRC connection establishment for the cell is unsuccessful consecutively N times.

5. The method of claim 1, wherein the second ACB parameter is applied to the cell when the RRC connection establishment for the cell is unsuccessful consecutively N times for a predetermined time.

6. The method of claim 1, wherein the second ACB parameter is applied to the cell when the RRC connection establishment for the cell is unsuccessful accumulatively N times for a predetermined time.

7. The method of claim 1, wherein the second ACB parameter is applied to the cell when all RRC connection establishment procedures are unsuccessful for a predetermined time after the RRC connection establishment for the cell is unsuccessful at first.

8. The method of claim 1, wherein the first ACB parameter and the second ACB parameter are received form the network.

9. The method of claim 8, wherein when the number of times of failure is more than a predetermined number (N) of times and the second ACB parameter is received, the second ACB parameter is applied to the cell.

10. The method of claim 1, wherein:
an ACB parameter correction value is received from the network, and
the second ACB parameter is generated by applying the ACB parameter correction value to the first ACB parameter.

11. The method of claim 1, wherein each of the first and second ACB parameters includes at least one of a barring factor and a barring time for the cell.

12. A terminal for establishing a radio resource control (RRC) connection for a cell, the terminal comprising:
a radio frequency (RF) unit transceiving a radio signal; and
a processor connected with the RF unit,
wherein the processor configured to
determine the number of times of failure in RRC connection establishment for the cell, and
apply a first access class barring (ACB) parameter or a second ACB parameter on the basis of the number of times of the failure, and
wherein the second ACB parameter is a parameter which increases an access blocking probability for the cell in comparison with the first ACB parameter.

* * * * *